United States Patent [19]
Barmore et al.

[11] Patent Number: 5,110,677
[45] Date of Patent: * May 5, 1992

[54] LETTUCE PACKAGING FILM

[75] Inventors: Charles R. Barmore, Moore; Henry G. Schirmer, Spartanburg, both of S.C.

[73] Assignee: W. R. Grace & Co.-Conn., Duncan, S.C.

[*] Notice: The portion of the term of this patent subsequent to Jun. 19, 2007 has been disclaimed.

[21] Appl. No.: 591,333

[22] Filed: Oct. 1, 1990

[51] Int. Cl.⁵ ............................................. B32B 7/12
[52] U.S. Cl. ................................ 428/349; 428/137; 428/409; 428/483; 428/475.8; 428/515; 428/516; 428/520; 426/127; 156/244.18
[58] Field of Search ............... 428/137, 35.2, 409, 428/515, 516, 520, 349, 483, 475.8; 426/127; 156/244.18, 244.11

[56] References Cited

U.S. PATENT DOCUMENTS 4,759,444  7/1988  Barmore ........................ 206/521
4,935,271  7/1990  Schirmer ....................... 428/349

FOREIGN PATENT DOCUMENTS 0178218  6/1988  European Pat. Off. .

Primary Examiner—Edith L. Buffalow
Attorney, Agent, or Firm—William D. Lee, Jr.; Leigh P. Gregory; Mark B. Quatt

[57] ABSTRACT

A multilayer laminate comprises a machinable inner component perforated film, preferably of a propylene homopolymer or copolymer, a first outer component film bonded to one side of the inner component film, and a second outer component film bonded to the opposite side of the inner component film, each of the first and second outer component films providing high gas permeability and low moisture transmission and including a bonding layer of ethylene copolymers and an outer heat sealable layer.

25 Claims, 2 Drawing Sheets

LETTUCE PACKAGING FILM

Lettuce is currently packaged in a variety of different materials including polyethylenes with and without ethylene/vinyl-acetate copolymers, polypropylenes, nylon/polyethylene laminates, and polyester/polyethylene laminates. The oxygen and carbon dioxide transmission rates of such structures are of primary importance in the packaging of all types of produce. By regulating the transmission of these two gases, enzymatic browning of cut surfaces is minimized or prevented and the damaging effects of product anaerobiosis are avoided. However, in most cases, the resulting oxygen and carbon dioxide transmission rates associated with structures also designed to provide abuse resistance and machinability are low, thereby reducing the shelf life of the produce.

With the packaging of lettuce and similar produce, it is desirable to provide a packaging material with a high gas permeability, preferably greater than about 5000 $cc/m^2$.atm.day on the average to minimize or prevent enzymatic browning and anaerobiosis, which also has a low moisture transmission rate in order to resist loss of moisture from the food product. Various polyethylenes demonstrate these properties of high permeability and low moisture transmission. Further, such materials demonstrate excellent sealing properties. However, in addition to permeability and sealability, the present application requires a film which is machinable, that is, one having the properties of heat resistance, low extensibility, and strength.

Such requirements were met by the structure of U.S. Pat. No. 4,935,271 to Schirmer which discloses a multi-layer laminate for use in the packaging of lettuce and the like having a first impermeable film of propylene homopolymer or copolymer having perforations defined therein, and a second permeable film bonded to the first film which includes a bonding layer of ethylene vinyl acetate copolymer and an outer heat sealable layer. In that laminate, machinability is provided by the polypropylene film which is perforated in order to render it permeable. The permeable second film contributes the properties of low moisture transmission and sealability to the overall structure. However, because the polypropylene side of the structure is not sealable to itself or to the sealing layer of the permeable film, only fin sealing is possible. By such method, the sealing layer of the second film is sealed to itself, leaving a projecting, sealed "fin". While fin sealing of such laminate material advantageously subjects only the heat resistant polypropylene film to direct contact with the sealing jaws, it also requires proper orientation of the laminate for sealing. That is, if the laminate is positioned such that the polypropylene side folds back against itself, sealing is precluded.

SUMMARY OF THE INVENTION

It is thus an object of the present invention to provide an improved material for use in the packaging of lettuce and similar produce which has a low moisture permeability and a high gas permeability.

It is still another object of the present invention to provide such an improved material for the packaging of lettuce and the like which is machinable, having heat resistance, non-extensibility and strength.

It is a further object of the present invention to provide a produce packaging laminate having sealing layers on both sides thereof such that fin sealing is possible regardless of the orientation of the material and such that lap sealing, wherein one side of the material must be sealable to the opposite side, can be achieved.

These, as well as other objects, are achieved by providing a multilayer laminate comprising an inner component of a strong, nonextensible, film having perforations defined therein, and outer component films, bonded to the inner component film, each having high permeability and low moisture transmission and preferably including a bonding layer of ethylene vinyl acetate copolymer and an outer heat sealable layer.

Such objects are further achieved by providing a method of making a multilayer laminate comprising providing a perforated film preferably comprising a propylene homopolymer or copolymer, coextruding a second film having a bonding layer of ethylene vinyl acetate copolymer and an outer heat sealable layer, and bonding a web of the second film to each side of the perforated film.

Moreover, such objects are achieved by providing a multilayer laminate which includes an inner component of a machinable film having perforations defined therein to lend permeability thereto, a first outer component film, bonded to one side of the inner component film, such first outer component film including a bonding layer of ethylene vinyl acetate copolymer and an outer heat sealable layer, and a second outer component film, bonded to the opposite side of the inner component film, the second outer component film including a bonding layer of ethylene vinyl acetate copolymer and an outer heat sealable layer.

DEFINITIONS

ETHYLENE COPOLYMER: Ethylene copolymers are copolymers of ethylene and vinyl acetate, alkyl acrylate or alpha-olefin. Also within the scope of the present definition are chemically modified derivatives of these materials.

EVA: EVA designates ethylene/vinyl-acetate copolymers.

LLDPE: LLDPE means linear low density polyethylene which generally is understood to include that group of ethylene/alpha-olefin copolymers having limited side chain branching and which fall into a density range of 0.910 to 0.940 g/cc. Sometimes linear polyethylene in the density range from 0.926 to 0.940 is referred to as linear medium density polyethylene (LMDPE). Typical brand names are Dowlex from Dow Chemical Company, Ultzex and Neozex from Mitsui Petro Chemical Company, and Sclair from duPont. The alpha-olefin copolymers are typically butene-1, pentene-1, hexene-1, octene-1, etc.

VLDPE and ULDPE: Very low density polyethylene (VLDPE) and ultra-low density polyethylene (ULDPE) mean ethylene/alpha-olefin copolymers which have a density of less than about 0.915 and, more specifically, usually 0.912 or below and may be below 0.89. Typical VLDPE resins are those designated DFDA by Union Carbide and are believed to principally or usually have butene or isobutene as a comonomer. The very low density polyethylenes as compared to LLDPE, usually have significantly higher copolymer content and distinctly different properties making them a distinct class of polymers. Typically, resins designated "ULDPE" resins come from Dow and are believed to have octene as the comonomer. There is a slight difference in properties which is thought to be attributable to the comonomer. As used herein the term "linear ethylene/alpha-olefin copolymer having a density of less than 0.915 g/cc" encompasses both VLDPE and ULDPE.

BRIEF DESCRIPTION OF THE DRAWINGS

The invention can be further understood by reference to the drawing figures, wherein.

DESCRIPTION OF THE PREFERRED EMBODIMENTS

The present invention is directed to a laminate for use in the packaging of lettuce and the like. Such application requires a packaging material having a low moisture transmission rate and a high gas transmission rate. Further, automation of the process requires the material to be machinable. Typically, those materials having the former properties do not demonstrate the latter and vice-versa. The present invention meets all of the prerequisites of this application by first providing a machinable film which is strong, non-extensible and heat resistant, but also impermeable and nonsealable, and then perforating it, thereby rendering it permeable. In order to provide sealability and low moisture transmission, permeable, heat sealable films are bonded to opposite sides of the perforated film. Thus a machinable laminate is provided which is both permeable and sealable by either fin or lap sealing. Relative gas and moisture transmissions are determined by the size and number of perforations designed in the inner impermeable film as well as the thickness and permeability of the outer films.

Figure 1:
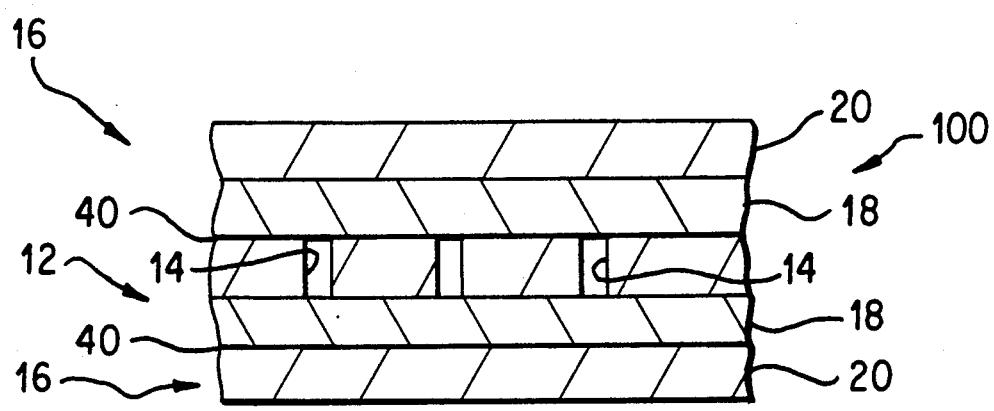
FIG. 1 is a schematic cross sectional view of the multilayer laminate of the present invention.

Referring to FIG. 1, the multilayer laminate 100 includes an inner film 12 having perforations 14 therein. In the preferred embodiments, layer 12 comprises a propylene homopolymer (PP), although a propylene copolymer such as ethylene propylene copolymer (EPC) may be used. Various homopolymers and copolymers of polypropylene are commercially available and well known in the art. One film especially preferred for the present invention is a commercial film designated PY, supplied by the Cryovac Division of W. R. Grace & Co.-Conn. Also within the scope of the present invention are other machinable films. Generally, such films are first stretch-oriented and then heat set, that is, held in a stretched configuration and heated to some temperature higher than the original orientation temperature but below the melt temperature such that shrinkage will occur at such temperature and not at the original orientation temperature. Such processing provides strength, low elongation and heat resistance. In addition to polypropylenes, polyesters and nylons may be oriented and heat set to provide the properties needed for good machinability required by the present invention.

A coextruded outer component film 16 is also depicted in FIG. 1. A web of film 16 is bonded to either side of film 12. The outer permeable films of the present invention may be of single or multiple layers comprised of ethylene copolymers, although other materials which provide the high permeability, low moisture transmission and sealability which must be provided by such outer components are also within the scope of the present invention. Most preferably film 16 is a multilayer film and, at least, includes a bonding layer 18 for bonding film 16 to film 12, and an outer heat sealable layer 20. However, it should be understood that the requirement that the outer component film includes at least a bonding layer and an outer heat sealable layer does not preclude a monolayer film which acts as both the bonding layer and the sealing layer. In the preferred embodiment, bonding layer 18 is composed of a high vinyl acetate, low melting point ethylene vinyl acetate copolymer (EVA) such as Alathon 3180 available from du Pont, having a melt index of between 23 and 27 grams/10 minutes, a vinyl acetate content by weight of between about 27% and 29%, and a density of between about, 0.948 and 0.954 grams per cubic centimeter. Outer heat sealable layer 20 can be the same material as in layer 18, or another ethylene vinyl acetate copolymer such as Exxon 32.89, an EVA with a vinyl acetate content of about 4.5%. Layer 20 can also be a very low density polyethylene (VLDPE). If film 16 is a monolayer film, it is preferably a high EVA-linear low density polyethylene (LLDPE) blend.

Lower vinyl acetate content EVA resins, such as the Exxon 32.89 material just described, may also be used as the material of the bonding layer 18 of film 16. However, when used in connection with a corona treatment process for bonding the film 16 to film 12, lower vinyl acetate EVA resins will not perform as well as higher vinyl acetate resins such as the du Pont material described above. High vinyl acetate content combined with relatively low melting points characterize the optimal EVA resins for bonding layer 18.

Figure 2:
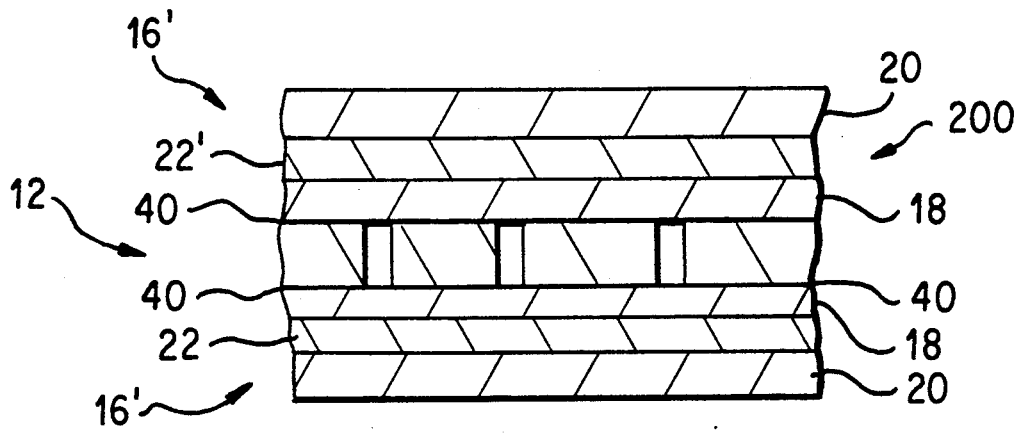
FIG. 2 is a schematic cross sectional view of an alternate embodiment of a multilayer laminate in accordance with the present invention.

Referring to FIG. 2, a multilayer laminate 200 like that of FIG. 1 is shown, but in which a core layer 22 is disposed between the bonding layer 18 and outer heat sealable layer 20 of outer component film 16'. Such core layer is preferably an ethylene/alpha-olefin copolymer. The preferred resin for bonding core layer 22 is a LLDPE such as Dowlex 2045 available from Dow and having a density of about 0.921 grams/cc.

Figure 3:
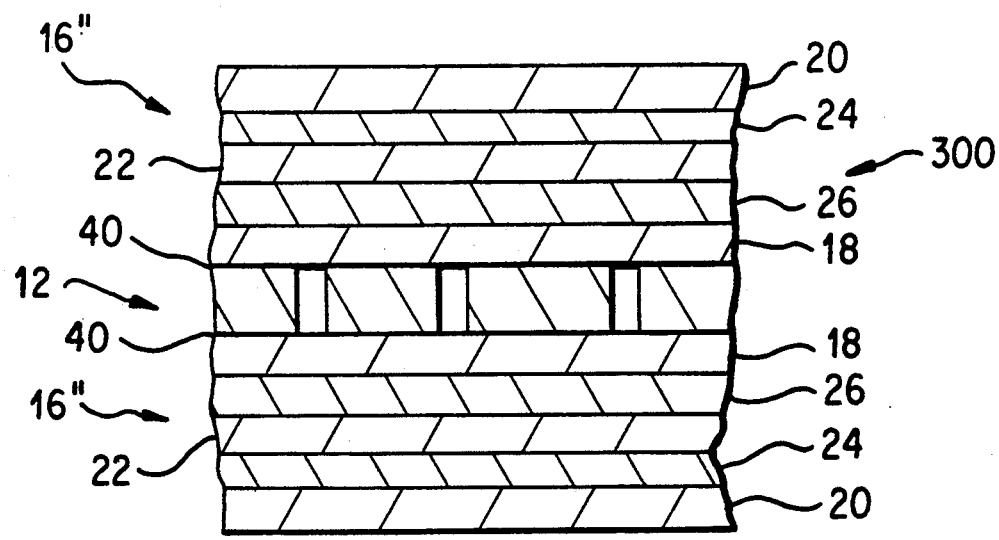
FIG. 3 is a schematic cross section of still another embodiment of the multilayer laminate of the present invention.

In still another embodiment of the present invention, depicted in FIG. 3, intermediate layers 26 and 24, preferably of an ethylene vinyl acetate copolymer, are disposed between core layer 22 and bonding layer 18 and outer heat layer sealable layer 20 respectively. These intermediate layers 24 and 26 can perform a variety of functions such as enhancing interlaminar bond strength, contributing to the strength of the overall coextruded film 16" and laminate 300, and providing other processing advantages.

A particularly suitable resin for intermediate layers 24 and 26 is Elvax PE-3508 available from du Pont. This material has a vinyl acetate content of about 12% by weight and a melt index of about 0.3 grams/10 minutes.

The inner component, perforated film 12 may be made by extruding a polypropylene, ethylene propylene copolymer, polyester or nylon film, orienting and heat setting the film and perforating same by means well known in the art such as flame or needle perforation.

The outer component, multilayer film 16 can be made by standard coextrusion techniques.

A web of multilayer film 16 is bonded to both sides of perforated film 12 preferably by corona treating both surfaces of film 12 and the bonding layer surface of film 16, and then, preferably under some heat and pressure, adhering the two webs of film 16 to the perforated film 12. This bond is designated at 40 in the drawings.

Other bonding techniques, including the use of conventional lamination adhesives, may also be used. However, bonding techniques in which a separate adhesive is utilized may be less desirable in that such adhesive may block the perforations of the inner impermeable film.

Figure 4:
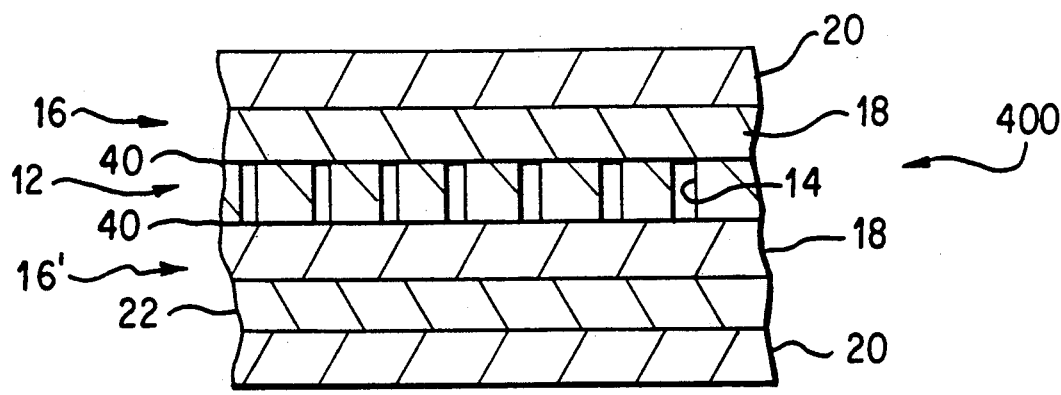
FIG. 4 is a schematic cross sectional view of yet another multilayer laminate in accordance with the present invention.
Figure 5:
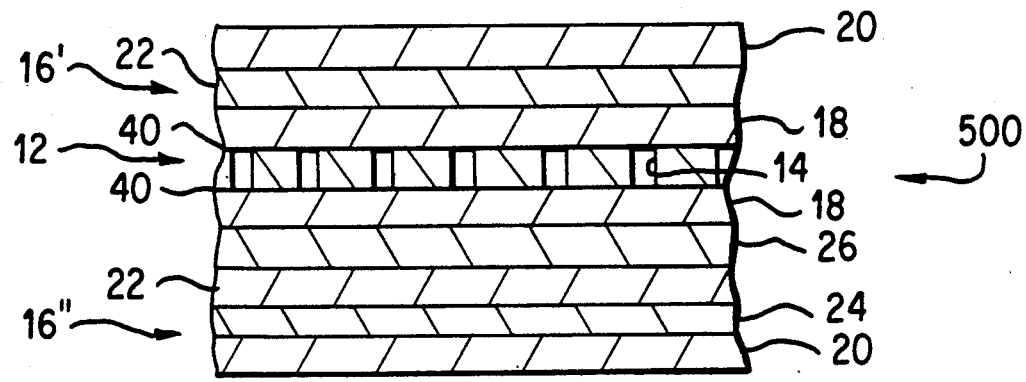
FIG. 5 is a schematic cross sectional view of a still further multilayer laminate in accordance with the present invention.
Figure 6:
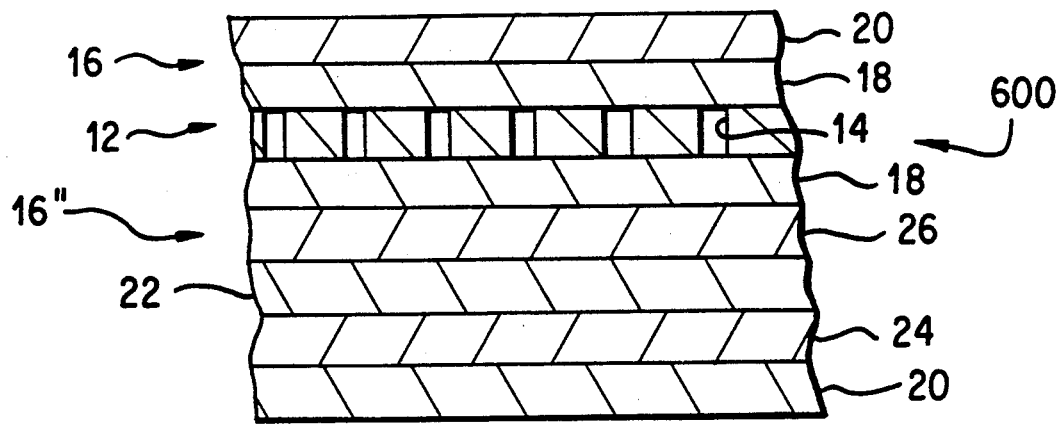
FIG. 6 is a schematic cross sectional view of another multilayer laminate in accordance with the present invention.

Referring to FIGS. 4-6, it is seen that differing embodiments of general film 16 may be bonded to opposite sides of inner component film 12. Thus, in FIG. 4, laminate 400 has two-layer film 16 bonded to one side of film 12 and three-layer film 16' bonded to the opposite side. Laminate 500 of FIG. 5 includes outer component films 16' and 16" bonded to opposing sides of film 12. Similarly, outer component films 16' and 16" are bonded to opposing sides of film 12 in laminate 600 as illustrated in FIG. 6.

Generally, each layer of each of films 16, 16' and 16" may be of any material disclosed herein as appropriate for that given layer. That is, the designations 16, 16' and 16" refer to a two-layer, a three-layer and a five-layer film, respectively, in accordance with the present invention rather than to specific film compositions. Therefore, film 16 may have, for example, a bonding layer of Alathon 3180 and a heat sealing layer Exxon 32.89 or a bonding layer of Exxon 32.89 and a heat sealing layer of VLDPE such that, for example, FIG. 1 represents an inner component film sandwiched between two two-layer outer component films in accordance with the present invention, whether those outer component films are identical in composition to each other or not.

However, while the Figures are not to be taken as limitative of the many film combinations possible in the present invention, it should be noted that for all of the laminates illustrated, it is generally preferable that the heat sealing layers of each of the two outer component films are at least compatible in order to provide for lap sealing. Most preferably, such heat sealing layers are identical for optimum heat sealability.

In the preferred embodiment, packaging film of the present invention is especially suitable for use in connection with Kartridg-Pak or other types of vertical form fill seal machinery. It should be noted, however, that unlike the structure of U.S. Pat. No. 4,935,271 discussed above, for the present invention heat sealable layers rather than the heat resistant film will come into direct contact with the sealing jaws. Such contact is necessary in order to provide for lap sealing, wherein one side of the laminate seals to the opposite side. Thus, the sealing jaws will preferably include a protective coating, such as tetrafluoroethylene, to prevent sticking.

The invention may be further understood by reference to Table 1 indicating specific laminate structures made in accordance with the present invention.

TABLE 1

| EXAMPLE | |
|---|---|
| 1 | VLDPE/EVA//PP//EVA/VLDPE |

TABLE 1-continued

| EXAMPLE | |
|---|---|
| 2 | EVA/LLDPE/EVA//PP//EVA/LLDPE/EVA |
| 3 | EVA/EVA/LLDPE/EVA/EVA//PP//EVA/EVA/LLDPE/EVA/EVA |
| 4 | VLDPE/EVA//PP//EVA/LLDPE/EVA |
| 5 | EVA/LLDPE/EVA//PP//EVA/EVA/LLDPE/EVA/EVA |
| 6 | EVA/EVA//PP//EVA/EVA/LLDPE/EVA/EVA |

In the film of Examples 3, 5, and 6, about 20% of the EVA of bonding layer 18 and outer heat sealable layer 20 comprised an antiblocking agent which had been preblended with the EVA prior to extrusion. The antiblocking agent used included 90% low density polyethylene blended with 10% of a colloidal silica master batch.

Although the outer permeable films, generally 16, of the present invention are represented as being either monolayer films or multilayer composites, it is to be understood that the relative thickness of any film 16 is not necessarily a function of the number of layers comprising such. For example, in Example 6 above, the inner perforated film is sandwiched between a two layer permeable film and a five layer permeable film. The five layer film is not necessarily thicker than the two layer film and may, in fact, be thinner than the two layer film. It is, instead, the overall combined thickness of the two films, depending on the relative permeabilities of each, in combination with the size and distribution of the inner web perforations which determines the gas and moisture transmission rates of the laminate as a whole.

Although the present invention has been described by reference to the specific embodiments and examples, a latitude of modification change and substitution is intended in the foregoing disclosure, those skilled in the art would readily understand that modifications may be made by one skilled in the art after a review of this description without departing from the spirit and scope of the claims which follow.

What is claimed is:

1. A multilayer laminate comprising:
   a) an inner component film having perforations defined therein;
   b) a first outer component film, bonded to one side of the inner component film, the first outer component film including a bonding layer of ethylene copolymers, and an outer heat sealable layer; and
   c) a second outer component film, bonded to the opposite side of the inner component film, the second outer component film including a bonding layer of ethylene copolymers, and an outer heat sealable layer.

2. A multilayer laminate according to claim 1 wherein said inner component film comprises a propylene homopolymer or copolymer.

3. A multilayer laminate according to claim 1 wherein the two outer components are comprised of the same film.

4. A multilayer laminate according to claim 3 wherein the bonding layer of each of the first and second outer component films comprises a high vinyl acetate, low melting point ethylene vinyl acetate copolymer.

5. A multilayer laminate according to claim 4 wherein the ethylene vinyl acetate copolymer has a vinyl acetate content, by weight of the resin, of between about 4.5% and 28%.

6. A multilayer laminate according to claim 3 wherein the outer heat sealable layer of each of the first and second outer component films is an ethylene vinyl acetate copolymer.

7. A multilayer laminate according to claim 6 wherein the outer heat sealable layer of each of the outer component films is the same material as that of the bonding layer.

8. A multilayer laminate according to claim 6 further comprising a core layer of ethylene/alpha-olefin copolymers disposed between the bonding layer and the outer heat sealable layer of each of the outer component films.

9. A multilayer laminate according to claim 8 wherein said core layer comprises linear low density polyethylene.

10. A multilayer laminate according to claim 9 wherein an intermediate layer of ethylene vinyl acetate copolymer is disposed between and bonds the core layer to each of the bonding and heat sealable layers respectively of each of the outer component films.

11. A multilayer laminate according to claim 1 wherein the outer heat sealable layer of each of the first and second outer component films is a very low density polyethylene.

12. A multilayer laminate according to claim 1 wherein the outer heat sealable layer of each of the outer component films comprises a blend of ethylene vinyl acetate copolymer and an antiblocking agent master batch.

13. A multilayer laminate according to claim 12 wherein the outer heat sealable layer of each of the outer component films comprising a blend of about 80% ethylene vinyl acetate copolymer and about 20% of an antiblocking agent master batch.

14. A multilayer laminate according to claim 1 wherein the inner component perforated film comprises a polyester.

15. A multilayer laminate according to claim 1 wherein the inner component perforated film comprises a nylon.

16. A multilayer laminate according to claim 1 wherein the inner component perforated film is oriented.

17. A multilayer laminate according to claim 16 wherein the inner component film is oriented and heat set.

18. A multilayer laminate according to claim 1 further comprising a core layer of linear low density polyethylene disposed between the bonding layer and the outer heat sealable layer of the first outer component film.

19. A multilayer laminate according to claim 18 wherein an intermediate layer of ethylene vinyl acetate copolymer is disposed between and bonds to the core layer to each of the bonding and heat sealable layers, respectively, of the first outer component film.

20. A multilayer laminate according to claim 19 further comprising a core layer of linear low density polyethylene disposed between the bonding layer and the outer heat sealable layer of the second outer component film.

21. A multilayer laminate according to claim 1 wherein the outer heat sealable layer of the first outer component film is the same as the outer heat sealable layer of the second outer component film.

22. A multilayer laminate according to claim 1 wherein the outer heat sealable layer of the first outer component film and the outer heat sealable layer of the second outer component film are compatible.

23. A method of making a multilayer laminate comprising:
  a) providing a first film;
  b) perforating said first film;
  c) coextruding a second film having a bonding layer of ethylene copolymers and an outer heat sealable layer; and
  d) bonding a web of the second film to each side of the perforated film.

24. A method according to claim 23 including the step of corona treating the second film at its bonding surface prior to bonding a web thereof to the perforated film.

25. A method of making a multilayer laminate comprising:
  a) providing a perforated, machinable film;
  b) coextruding a second film having a bonding layer of ethylene copolymers and an outer heat sealable layer;
  c) coextruding a third film having a bonding layer of ethylene copolymers and an outer heat sealable layer;
  d) bonding a web of the second film to one side of the perforated film; and
  e) bonding a web of the third film to the other side of the perforated film.

* * * * *